US009678605B2

(12) United States Patent
Jordan et al.

(10) Patent No.: US 9,678,605 B2
(45) Date of Patent: Jun. 13, 2017

(54) SYSTEMS AND METHODS FOR SWITCHING SENSING REGIMES FOR GLOVED AND UNGLOVED USER INPUT

(75) Inventors: Joel Jordan, Sunnyvale, CA (US); Adam Schwartz, Redwood City, CA (US)

(73) Assignee: Synaptics Incorporated, Santa Clara, CA (US)

( * ) Notice: Subject to any disclaimer, the term of this patent is extended or adjusted under 35 U.S.C. 154(b) by 244 days.

(21) Appl. No.: 13/536,776

(22) Filed: Jun. 28, 2012

(65) Prior Publication Data

US 2014/0002340 A1    Jan. 2, 2014

(51) Int. Cl.
G06F 3/044    (2006.01)
G06F 3/041    (2006.01)

(52) U.S. Cl.
CPC ............ G06F 3/044 (2013.01); G06F 3/0416 (2013.01)

(58) Field of Classification Search
CPC ...................................... G06F 3/041
USPC .................................. 345/173–179
See application file for complete search history.

(56) References Cited

U.S. PATENT DOCUMENTS

| 6,492,979 | B1 | 12/2002 | Kent et al. |
| 7,777,732 | B2 | 8/2010 | Herz et al. |
| 2007/0075710 | A1* | 4/2007 | Hargreaves ........ G01R 27/2605 324/658 |
| 2007/0229466 | A1* | 10/2007 | Peng et al. .................... 345/173 |
| 2009/0058687 | A1* | 3/2009 | Rothkopf ............ G06F 3/03547 341/20 |
| 2009/0231282 | A1 | 9/2009 | Fyke |
| 2010/0164889 | A1 | 7/2010 | Hristov et al. |
| 2010/0292945 | A1 | 11/2010 | Reynolds et al. |
| 2012/0200531 | A1* | 8/2012 | Araki ............................. 345/174 |
| 2012/0268411 | A1* | 10/2012 | Chen et al. .................... 345/174 |

(Continued)

FOREIGN PATENT DOCUMENTS

| JP | 2008033701 A | 2/2008 |
| KR | 1020100089646 | 8/2010 |
| WO | 0235461 A1 | 5/2002 |

OTHER PUBLICATIONS

The International Searching Authority, International Search Report and Written Opinion for PCT International Application No. PCT/US2013/048147, mailed Oct. 22, 2013.

*Primary Examiner* — Alexander Eisen
*Assistant Examiner* — Cory Almeida
(74) *Attorney, Agent, or Firm* — Osha Liang LLP

(57) ABSTRACT

The various embodiments described herein provide input devices configured to selectively operate in two different sensing regimes. The first sensing regime is configured to determine positional information for ungloved fingers in the sensing region. The second sensing regime is configured to determine positional information for gloved fingers in the sensing region. The input devices are further configured to switch from operating in the first sensing regime to the second sensing regime responsive to detecting an input gesture that meets each of a set of criteria, where the set of criteria includes a measure of sensor value stability corresponding to the input gesture being beyond a sensor value stability threshold level. So implemented, the input device allows a user to easily switch between two different sensing regimes, and thus can facilitate the use of the device with both gloved and ungloved fingers providing input.

21 Claims, 8 Drawing Sheets

(56) References Cited

U.S. PATENT DOCUMENTS

2013/0038556 A1     2/2013   Nakai
2013/0093703 A1     4/2013   Yang et al.

\* cited by examiner

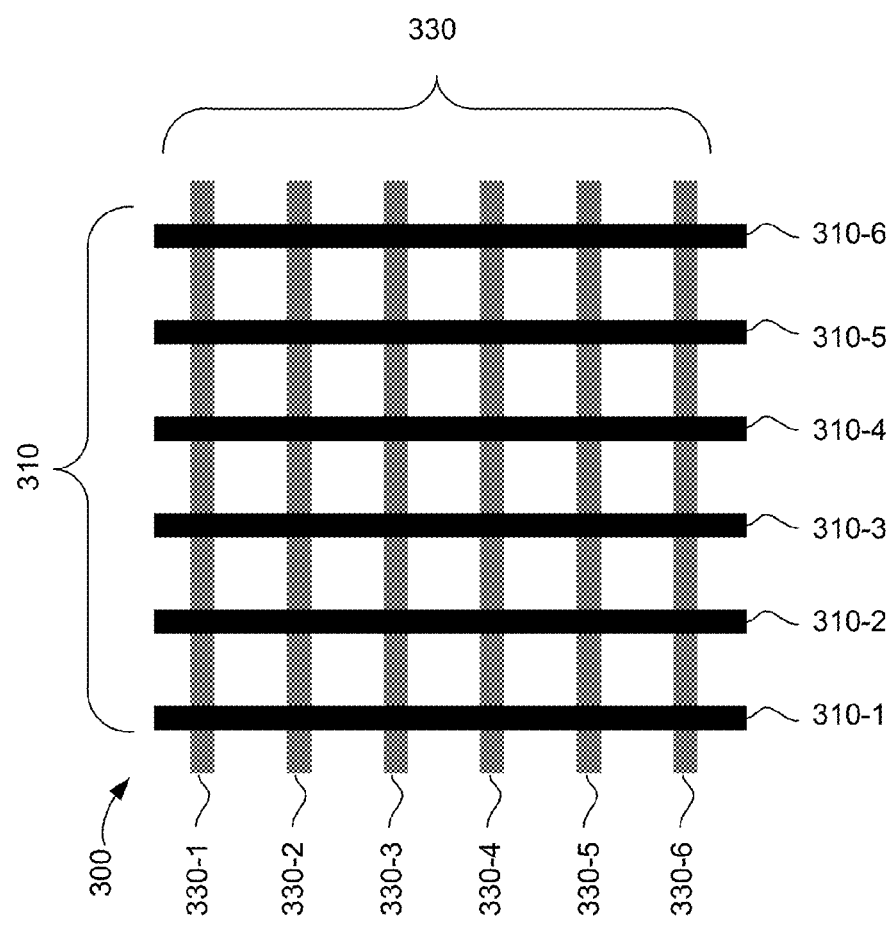

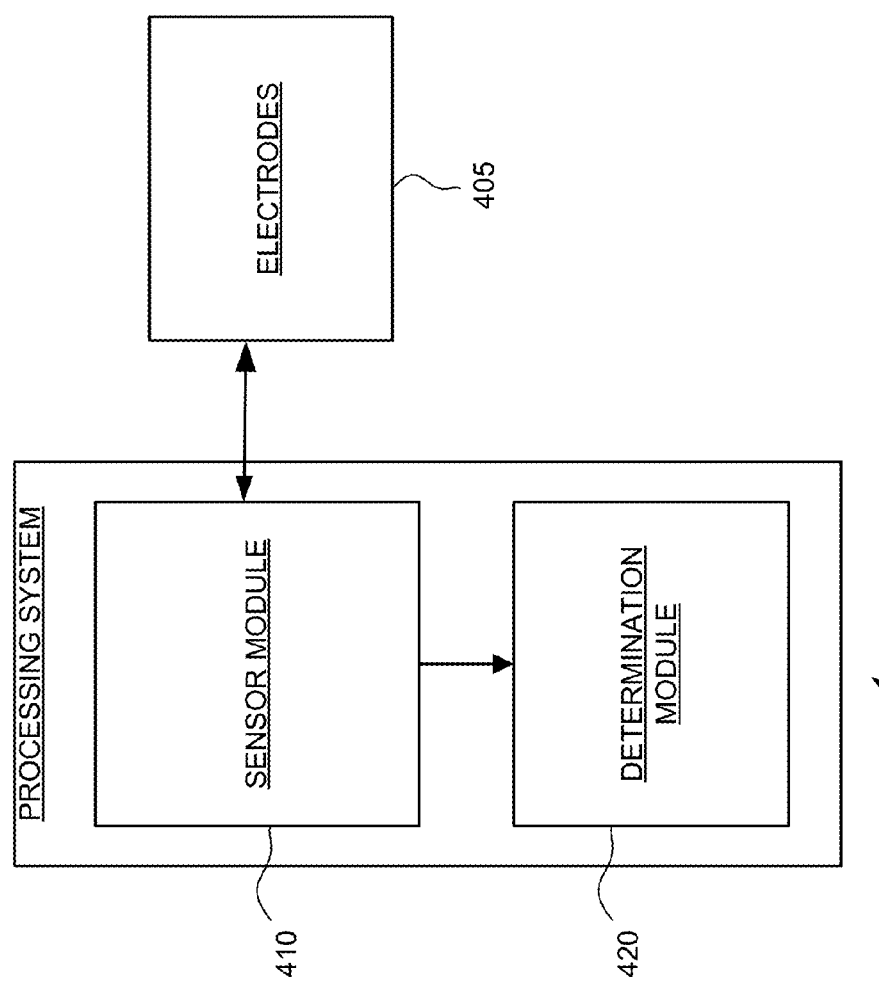

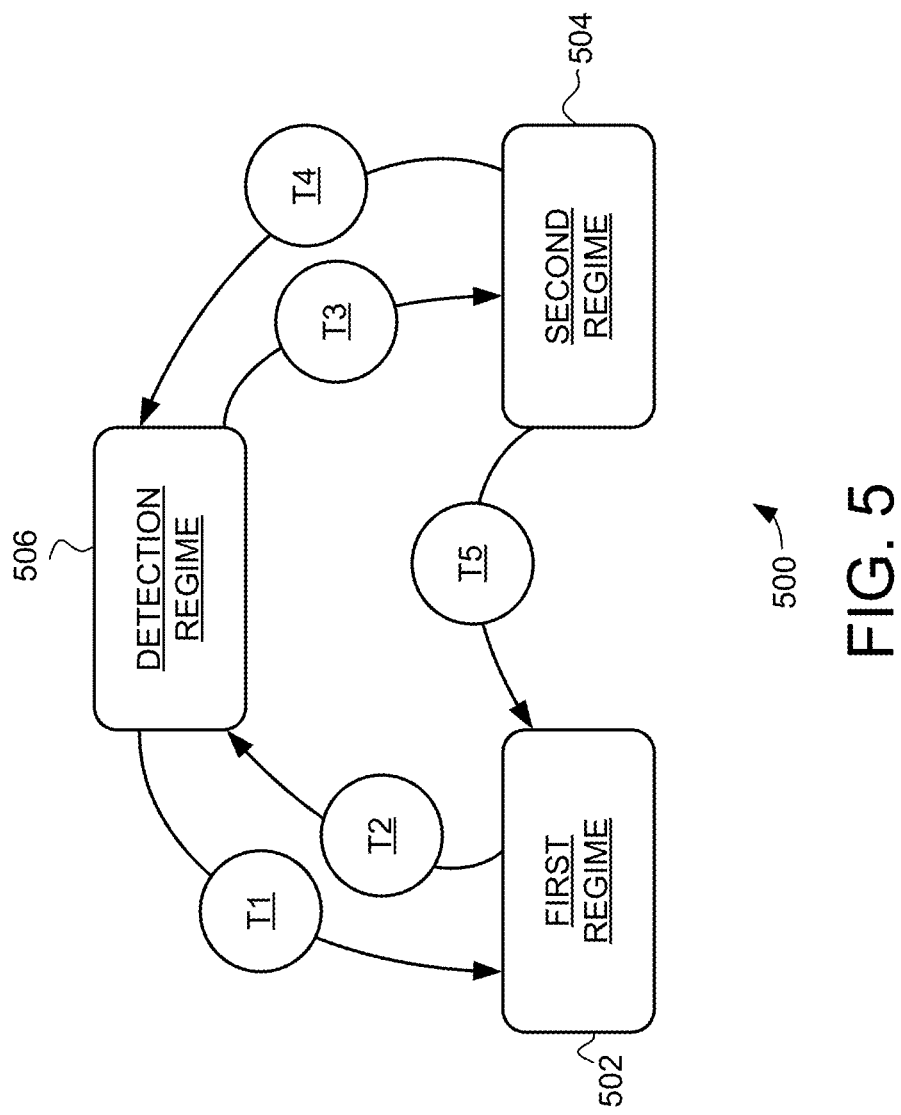

SYSTEMS AND METHODS FOR SWITCHING SENSING REGIMES FOR GLOVED AND UNGLOVED USER INPUT

FIELD OF THE INVENTION

This invention generally relates to electronic devices, and more specifically relates to input devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers).

Proximity sensor device can be used to enable control of an associated electronic system. For example, proximity sensor devices are often used as input devices for larger computing systems, including: notebook computers and desktop computers. Proximity sensor devices are also often used in smaller systems, including: handheld systems such as personal digital assistants (PDAs), remote controls, and communication systems such as wireless telephones and text messaging systems. Increasingly, proximity sensor devices are used in media systems, such as CD, DVD, MP3, video or other media recorders or players. The proximity sensor device can be integral or peripheral to the computing system with which it interacts.

One issue with some past input devices is that the some proximity sensor devices are limited to reliably receiving input with objects that are at or very near the surface. Specifically, most proximity sensor devices can accurately determine location and/or motion of objects that are either right at the surface, or very near to the surface. However, when the objects are farther away from the surface the device the accuracy degrades, and most devices cannot reliably respond to such objects, and thus simply ignore such objects.

This is of particular issue when users try and use input devices while wearing gloves. Some gloves prevent the finger of the user from getting close enough to have the position of the finger reliably detected. The extent that gloves interfere with use will generally depend on the thickness and dielectric constant of the glove. The thicker the glove, and the lower the dielectric constant of the glove, the more likely that the position of finger will not be reliably detected.

Thus, there exists a need for improvements in proximity sensor device that improves device flexibility and usability. Other desirable features and characteristics will become apparent from the subsequent detailed description and the appended claims, taken in conjunction with the accompanying drawings and the foregoing technical field and background.

BRIEF SUMMARY OF THE INVENTION

The embodiments of the present invention provide devices and methods that facilitate improved input devices. Specifically, the devices, systems and methods provide users the ability to easily and reliably switch between different sensing regimes. The different sensing regimes can be used to facilitate accurate position determination of objects both at the surface and away from the surface. For example, the different sensing regimes can be used to determine position information for both ungloved and gloved fingers touching the surface. As another example, the different sensing regimes can be used to determine position information for both touching and hovering objects.

In one embodiment, a processing system for an input device comprises a sensor module and a determination module. The sensor module is configured to operate a plurality of capacitive sensor electrodes to generate sensor values indicative of input objects in a sensing region. The determination module is configured to selectively operate in two different sensing regimes. The first sensing regime is configured to determine positional information for ungloved fingers in the sensing region. The second sensing regime is configured to determine positional information for gloved fingers in the sensing region. The determination module is further configured to switch to operating in the second sensing regime responsive to detecting an input gesture that meets each of a set of criteria, where the set of criteria includes a measure of sensor value stability corresponding to the input gesture being beyond a sensor value stability threshold level. So implemented, the processing system allows a user to easily switch between at least two different sensing regimes, and thus can facilitate the use of the device with both gloved and ungloved fingers providing input.

In another embodiment, an input device comprises a touch surface, a plurality of capacitive sensor electrodes and a processing system. The processing system is coupled to the plurality of capacitive sensor electrodes and is configured operate the plurality of capacitive sensor electrodes to generate sensor values indicative of input objects in a sensing region. The processing system is further configured to selectively electively operate in a first sensing regime configured to determine positional information for ungloved fingers in the sensing region, and selectively operate in a second sensing regime configured to determine positional information for gloved fingers in the sensing region. The processing system is further configured to switch to operating in the second sensing regime responsive to detecting an input gesture that meets each of a set of criteria, where the set of criteria includes a measure of sensor value stability corresponding to the input gesture being beyond a sensor value stability threshold level. So implemented, the input device allows a user to easily switch between at least two different sensing regimes, and thus can facilitate the use of the device with both gloved and ungloved fingers providing input.

In any of these and other embodiments the providing of at least two sensing regimes, and the ability to switch between sensing regimes, can be used to facilitate accurate position determination of objects both gloved and ungloved fingers. The switching between sensing regimes could also be used to facilitate position determination for objects that are away from a surface, such as hovering fingers. Such devices, systems and methods can thus be used to reliably receive input from both objects that are at or very near the surface, and objects that are farther away from the surface, such as gloved fingers. Thus, the devices, systems and methods can improve both the flexibility and usability of such devices.

BRIEF DESCRIPTION OF DRAWINGS

The preferred exemplary embodiment of the present invention will hereinafter be described in conjunction with the appended drawings, where like designations denote like elements, and:

FIG. 3 is a block diagram of sensor electrodes in accordance with an exemplary embodiment of the invention;

FIG. 4 is a conceptual block diagram depicting a processing system in accordance with an embodiment of the invention;

FIG. 5 is a state diagram illustrating transitions between sensing regimes in accordance with an embodiment of the invention.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
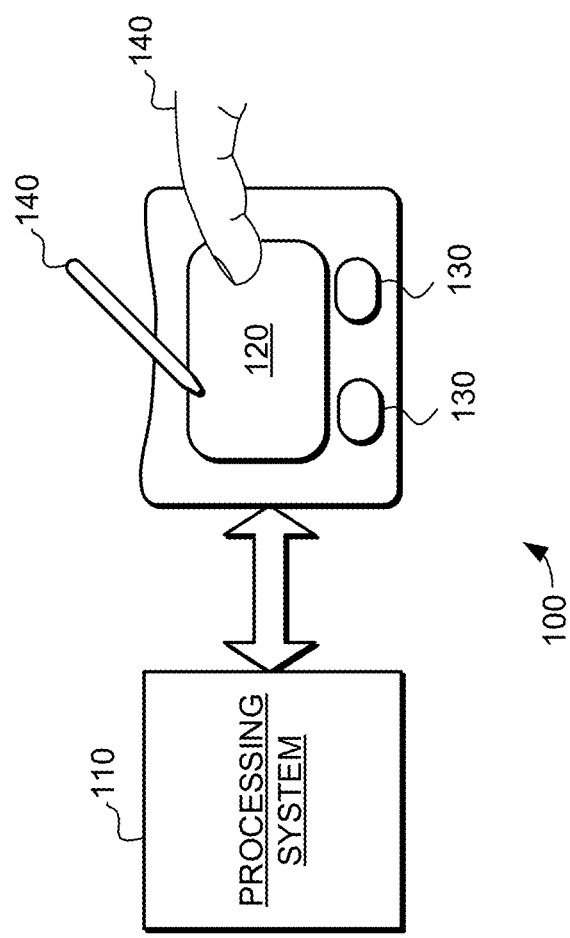
FIG. 1 is a block diagram of an exemplary system that includes an input device in accordance with an embodiment of the invention.

Various embodiments of the present invention provide input devices and methods that facilitate improved usability. FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 utilizes capacitive sensing to detect user input in the sensing region 120. To facilitate capacitive sensing, the input device 100 comprises one or more sensing electrodes for detecting user input. Some implementations are configured to provide images that span one, two, three, or higher dimensional spaces. Some implementations are configured to provide projections of input along particular axes or planes. In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

In some embodiments, the input device is configured to utilize both "absolute capacitance" and "transcapacitive" sensing methods. Absolute capacitance sensing methods, sometimes referred to as "self capacitance", are based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Transcapacitive sensing methods, sometimes referred to as "mutual capacitance", are based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters")

and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, as described above, the processing system 110 may include the circuit components for operating a plurality of capacitive sensor electrodes to generate sensor values indicative of input objects in a sensing region. This can include circuit components for selectively performing absolute capacitive sensing by modulating capacitive sensor electrodes with respect to a reference voltage. This may further include circuit components for transmitting signals with transmitter sensor electrodes, and receiving signals with receiver sensor electrodes to selectively perform transcapacitive sensing.

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s). In accordance with the embodiments described herein, the sensor module may be configured to operate a plurality of capacitive sensor electrodes to generate sensor values indicative of input objects in a sensing region. A further example includes determination modules, where the determination module is configured to determine positional information for input objects in the sensing region by selectively operating in an first sensing regime configured to determine positional information for ungloved fingers in the sensing region and selectively operating in a second sensing regime configured to determine positional information for gloved fingers in the sensing region. The determination module may be further configured to switch to operating in the second sensing regime responsive to detecting an input gesture that meets each of a set of criteria, where the set of criteria includes a measure of sensor value stability corresponding to the input gesture being beyond an sensor value stability threshold level.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes a determination module configured to determine positional information for an input device based on the measurement.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2B:
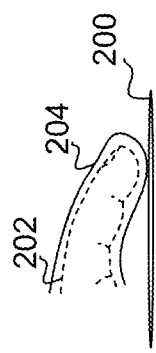
FIG. 2 are schematic views of exemplary fingers at a touch surface and away from the touch surface.
Figure 2A:
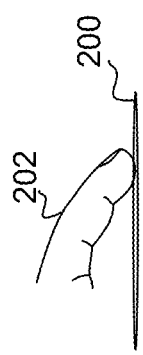

Turning now to FIG. 2, examples of objects at and away from a sensitive surface are illustrated schematically. Specifically, FIG. 2A shows an example of a user's finger 202 at the touch surface 200 of a proximity sensor device. Likewise, FIG. 2B shows an example of a user's finger 202 inside a glove 204, where the glove is at the touch surface 200. In this case, while the glove 204 is touching the surface 200, the finger 202 does not. Instead, the finger 202 is kept some distance from the surface 200 because of the glove 200. Because typical gloves are non-conductive and largely filed with air having a low dielectric constant, the capacitive effects of a gloved finger in FIG. 2B are much like that of a finger hovering above the surface 200.

As described above, in many cases fingers and other conductive objects that are away from the surface may not be reliably detected for position determination. Specifically, many implementations of capacitive sensing, including typical implementations of transcapacitive sensing, have limited range to capacitively detect objects away from the surface. In general, because transcapacitive sensing uses signals transmitted between electrodes, the capacitive changes caused by a finger a significant distance away from the surface (such as gloved finger 202 in FIG. 2B) may be below the level that can be reliably detected. This limited range may be caused by several factors, including the size and location of the electrodes, the strength of the transmitted and received signals, receiver gain, threshold and baseline levels used, and types of filtering used. Specifically, when these various factors are implemented to optimize for position determination of objects at the surface these same factors may prevent objects from being accurately detected away from the surface.

For these reasons, the embodiments described herein provide multiple sensing regimes, with the sensing regimes having different abilities to reliably detect objects at the surface (a first portion of the sensing region) and away from the surface (a second portion of the sensing region). For example, different sensing regimes may be enabled by having different usages of transcapacitive and absolute capacitive sensing, different touch thresholds, different receiver gain, different filtering, different baseline acquisition and use, different processing of resulting signals, etc.

Finally, it should be noted that in FIG. 2A the conductive portion of the user's finger 202 is in a first portion of the sensing region nearest the surface 200. In contrast, in FIG. 2B the conductive portion user's finger is in second portion of the sensing region, where the first portion of the sensing region is between the surface 200 and the second portion of the sensing region. The extent of these regions will depend on the implementation of the various sensing regimes, and there is no requirement for any specific or defined boundary between the first and second portions.

Returning now to FIG. 1, in accordance with various embodiments of the invention, the processing system 110 is configured to operate with multiple sensing regimes, and provide the ability to switch between sensing regimes in response to an input gesture that meets a set of criteria. The multiple different sensing regimes provide for accurate position determination of objects both at the surface (e.g., an ungloved finger at a first portion of the sensing region) and away from the surface (e.g., a gloved finger, where the glove keeps the finger itself away from the surface and in a second portion of the sensing region). Specifically, the input device 100 is configured with the processing system 110 coupled to a plurality of capacitive sensor electrodes (not shown in FIG. 1). The processing system 110 is configured to operate a plurality of capacitive sensor electrodes to generate sensor values indicative of input objects in sensing region 120 of the input device 100.

It should be noted that because the first regime is adapted to detect and determine position for objects at the surface it can do so reliably and accurately. However, the first regime will generally not reliably detect objects that are away from the surface. For example, because the capacitive techniques used have a more limited range.

Likewise, because the second regime is adapted to detect and determine position for objects away from surface, such as gloved fingers, it can do so reliably and accurately. However, the second regime may have limited ability to detect objects at the surface. For example, because of higher sensitivity it may be more vulnerable to types of noise, such as finger coupled noise. Also, if the second sensing regime uses different capacitive techniques such as absolute capacitive sensing instead of transcapacitive sensing, it may have more limited ability to detect and determine position of multiple objects simultaneously than the first sensing regime.

For these reasons, it is desirable to provide mechanisms for putting the input device 100 into the correct sensing regime during operation. It should be noted operating in the first sensing regime may inherently make it more difficult for the system to detect and/or recognize gloved fingers when the user attempts to use them in this regime. This inability to reliably detect gloved fingers while in the first sensing regime makes it problematic for a user to use such a gloved finger to initiate a switch directly from the first sensing regime to the second sensing regime. Thus, when if a user attempts to switch from using an ungloved finger to a gloved finger, or otherwise start using a gloved finger, such input is likely to be improperly recognized.

For these reasons, the input device 100 is implemented to switch to the second regime in response to an input gesture that meets a set of criteria. The set of criteria are selected to be indicative of a user attempting to utilize a gloved finger to input on the device. Thus, when detected, the input device 100 may reasonably switch to the second sensing regime to facilitate input with gloved fingers when such an input gesture is detected. As will be described in greater detail below, this set of criteria may include a measure of sensor value stability corresponding to the input gesture being beyond a sensor value stability threshold level. Thus, the input device 100 allows a user to easily switch between two different sensing regimes, and thus can facilitate the use of the device with both gloved and ungloved fingers providing input.

In such embodiments, the providing of the ability to easily switch to the second sensing regime can be used to facilitate accurate position determination of objects including both gloved and ungloved fingers.

Turning now to FIG. 3, this figure conceptually illustrates an exemplary set of capacitive sensor electrodes 300 configured to sense in a sensing region. For clarity of illustration and description, FIG. 3 shows a pattern of simple rectangles; however, it will be appreciated that the invention is not so limited, and that a variety of electrode patterns may be suitable in any particular embodiment. The capacitive sensor electrodes 300 are examples of electrodes that can be utilized to facilitate capacitive sensing using multiple different sensing regimes. For example, in one embodiment, the sensor electrodes 310 and 330 are configured to operate using both absolute sensing techniques and transcapacitive sensing techniques.

As one example, when using absolute capacitive techniques the sensor electrodes 310 and 330 may be modulated with respect to a reference voltage and resulting voltage levels on electrodes measured to determine changes in absolute capacitance. In such a usage, the sensor electrodes 310 are configured to sense input object position and/or motion in the "X direction", and sensor electrodes 330 are configured to sense input object position and/or motion in the "Y direction", although such labels are largely arbitrary. In such an embodiment the sensor electrodes 310 would typically be modulated and voltages at the electrodes 310 measured, and then sensor electrodes 330 would similarly be modulated and voltages at the electrodes 330 measured. Such a procedure will result in a set or "profile" of voltage measurements for the X direction and a set or "profile" of voltage measurements for the Y direction. The presence of conductive objects such as fingers changes these X and Y profiles, and thus the profiles can be analyzed to determine the position information for such objects in the sensing region. Specifically, multiple capacitive profiles may be acquired over multiple time periods, and differences between them used to derive information about input in the sensing region. For example, successive capacitive profiles images acquired over successive periods of time can be used to track the motion(s) of one or more input objects entering, exiting, and within the sensing region.

In other sensing regimes, the sensor electrodes 310 may be used for transcapacitive sensing. In such a sensing regime, the sensor electrodes 310 may be used as receiver electrodes and sensor electrodes 330 may be used as transmitter electrodes. In such embodiments the transmitter sensor electrodes 330 may be modulated relative to a reference voltage (e.g., system ground) to transmit transmitter signals, while receiver sensor electrodes 310 are held substantially constant relative to the reference voltage to facilitate receipt of resulting signals. The resulting signals received on receiver sensor electrodes 310 comprise effect(s) corresponding to one or more transmitter signals. By selectively transmitting from transmitter sensor electrodes 330 and receiving resulting signals using receiver sensor electrodes 310, the sensor electrodes 310 and 330 use transcapacitive sensing to sense input object position in both the X and Y directions.

Sensor electrodes 310 and 330 are typically ohmically isolated from each other. That is, one or more insulators separate sensor electrodes 310 and 330 and prevent them from electrically shorting to each other. In some embodiments, sensor electrodes 310 and 330 are separated by insulative material disposed between them at cross-over areas; in such constructions, the sensor electrodes 310 and/or sensor electrodes 330 may be formed with jumpers connecting different portions of the same electrode. In some embodiments, sensor electrodes 310 and 330 are separated by one or more layers of insulative material. In some other embodiments, sensor electrodes 310 and 330 are separated by one or more substrates; for example, they may be disposed on opposite sides of the same substrate, or on different substrates that are laminated together. The capacitive coupling between the transmitter electrodes and receiver electrodes change with the proximity and motion of input objects in the sensing region associated with the transmitter electrodes and receiver electrodes.

In a one embodiment, during transcapacitive sensing the sensor electrode 300 pattern is "scanned" to determine the capacitive couplings between transmitter and receiver electrodes. That is, the transmitter electrodes are driven to transmit transmitter signals and the receiver electrodes are used acquire the resulting signals. The resulting signals are then used to determine measurements of the capacitive couplings between electrodes, where each capacitive coupling between a transmitter electrode and a receiver electrode provides one "capacitive pixel". A set of measured values from the capacitive pixels form a "capacitive image" (also commonly referred to as a "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

It should be noted the embodiment illustrated in FIG. 3 is just one example of the type of electrodes that can be used in the multiple sensing regimes of the various embodiments. Furthermore, it should be noted that while the use absolute capacitive sensing is described as being used to determine capacitive X and Y profiles, that this is just one example. For example, absolute capacitive sensing could be used to determine an image of sensing data, or data in other coordinate systems (e.g., polar coordinates). Likewise, while the use of transcapacitive sensing is described as being used to generate rectangular array of capacitive values images that, this is just one example.

Referring now to the conceptual block diagram depicted in FIG. 4, one embodiment of an exemplary processing system 110 as shown in FIG. 1 may include a system 400. System 400, as illustrated, generally includes sensor module 410 communicatively coupled to a set of sensor electrodes (or simply "electrodes") 404, and to a determination module 420. In accordance with the embodiments described herein, the sensor module 410 is configured to operate in different sensing regimes adapted to determine positional information for ungloved and gloved fingers.

Sensor module 410 and determination module 420 may include any combination of hardware and/or software configured to operate the sensor electrodes 404. This may include any combination of hardware and/or software for modulating electrodes in sensor electrodes 404 with respect to a reference voltage and measuring resulting voltage levels to determine changes in absolute capacitance. This may also include any combination of hardware and/or software for transmitting signals with transmitter electrodes and receive resulting signals with receiver electrodes to perform transcapacitive sensing.

In the illustrated embodiment, determination module 420 includes any combination of hardware and/or software configured to determine positional information for input objects in the sensing region using at least the first and second sensing regimes. As described above, this can involve receiving sensor values from the sensor module 410 and processing those sensor values. The received sensor values can be generated from measured voltages on electrodes when performing absolute capacitive sensing, and can also be generated from resulting signals when performing transcapacitive sensing. These sensor values can then processed and analyzed to determine position information for input objects. This processing can involve the use of various baseline values, threshold values and various types of filtering. Furthermore, this processing can include techniques used to locate objects using the sensor values. For example, by using curve fitting and spatial correlation techniques. Determination module 420 is thus configured to then determine positional information for an input object (e.g., input object 140 in FIG. 1) based on the measurements.

The determination module 410, like the processing system 400 in general, is adapted to selectively operate in at least two different sensing regimes. Again, the first sensing regime is adapted to determine position information for objects at the surface of the input device 100, while the second sensing regime is adapted to determine position information for objects that are away from the surface, such as gloved or hovering fingers.

This can be accomplished in a variety of ways. In general, the operating in the first sensing regime the processing system 400 is configured to indicate positional information for input objects in the sensing region using relatively low sensitivity techniques (e.g., shorter range) configured to detect ungloved fingers, and while operating in the second sensing regime the processing system 400 is configured to indicate positional information for input objects in the sensing region using relatively high sensitivity techniques (e.g., longer range) configured to detect gloved fingers. As another example that will be described in greater detail below, the determination module 410 may be adapted to process sensor values from absolute and transcapacitive sensing in the first and second sensing regimes. In some embodiments of the determination module 410, other features may differentiate the first sensing regime and the second sensing regime. These other features may provide increased performance for determining object position for objects at the surface when using the first sensing regime, while providing increased performance for determining object position for gloved fingers when using the second sensing regime. As specific examples, the determination module 410 can utilize different receiver gains, filtering, baseline and sensitivity thresholds in the different sensing regimes. The determination module 410 can also use different techniques for determining positional information from measured sensor values in the different sensing regimes. For example, the determination module 410 can use curve fitting in the first sensing regime for determining object position for objects at the surface, and can use spatial correlation in the second sensing regime for determining object position for objects away from the surface.

As described above, the processing system 400 provide users the ability to easily and reliably switch between different sensing regimes to facilitate accurate position determination of both gloved and ungloved fingers. In general, the two sensing regimes provide the ability to reliably determine accurate position information for both gloved and ungloved fingers. Because the first regime is adapted to detect and determine position for objects at the surface it can do so reliably and accurately. However, the first regime will generally not reliably detect objects that are away from the surface. For example, because the capacitive techniques used have a more limited range.

Likewise, because the second regime is adapted to detect and determine position for objects away from surface, such as gloved fingers, it can do so reliably and accurately. However, the second regime may have limited ability to detect objects at the surface. For example, because of higher sensitivity it may be more vulnerable to types of noise, such as finger coupled noise. Also, if the second sensing regime uses different capacitive techniques such as absolute capacitive sensing instead of transcapacitive sensing, it may have more limited ability to detect and determine position of multiple objects simultaneously than the first sensing regime.

For all these reasons it is desirable for the processing system 400 to operate in the most appropriate sensing regime during use. To accomplish this, the processing system 400 may be configured to default to one sensing regime, and switch to another sensing regime based on the occurrence or non-occurrence of contact on the touch surface. For example, the input device could default to the first sensing regime to provide the most capable performance overall, and then in accordance with the various embodiments described herein, switch to the second sensing regime in response an input gesture that meets a set of criteria. This will allow the input device to have the best performance overall, but allow the input device to be put into a second sensing regime for gloved finger input as needed.

Turning now to FIG. 5, a state diagram 500 illustrates an exemplary switching procedure between sensing regimes. The state diagram 500 is an example of how the processing system 400 can be implemented to selectively switch sensing regimes, and in particular, to switch to the second sensing regime for use in detecting gloved fingers.

The state diagram 500 includes a first regime 502, a second regime 504, a detection regime 506, and transitions T1-T5. As described above, the first sensing regime 502 may be implemented to sense objects at a surface, such as ungloved fingers, while the second sensing regime is implemented to have greater range to facilitate sensing objects away from the surface (e.g., hovering or gloved fingers). In this embodiment the detection regime 506 may be implemented to provide sensing that can be used to determine which of the first sensing regime 502 and second sensing regime 504 the input device should be operated when an input object is detected. As such, detection regime 506 would be implemented with some ability to detect both objects at and away from the surface, and both gloved and ungloved fingers. In one example, this can be implemented by operating the detection regime with an intermediate duty cycle of absolute capacitive sensing and an intermediate duty cycle of transcapacitive sensing, where such intermediate duty cycles are between the respective first and second duty cycles. Additionally, as other examples, the detection regime 506 can utilize different resulting signal gains, perform different filtering operations on resulting signals, manage different baseline values and sensitivity thresholds. Thus, in each of these various ways the detection regime 506 may be implemented detect both gloved and ungloved fingers to facilitate the correct transition to the first sensing regime 502 and the second sensing regime 504.

As noted above, the state diagram 500 includes transitions T1-T5. The transition T1 transitions from the detection regime 506 to the first regime 502. A variety of criteria can be used to initiate such a transition T1. As one example, the transition T1 may be implemented to transition from the detection regime 506 to the first regime 502 when contact on the sensing surface is detected. Such contact information may be derived from the sensor electrodes or may be derived from additional contact sensors. In such an embodiment it may be desirable to distinguish between conductive and non-conductive objects, such that the transition T1 occurs only in response to a conductive object touching the touch surface. Again, this would be used to distinguish between actual attempts at user input compared to inadvertent contact with other objects. As another example, the transition T1 may be implemented to transition from the detection regime 506 to the first regime 502 when changes in resulting signals beyond a threshold level are detected. For examples, when resulting signals are detected that are highly indicative of a conductive object at the surface.

The transition T2 transitions back from the first regime 502 to the detection regime 506. A variety of criteria can be used to initiate such a transition T2. In general, criteria would be selected that are indicative of an input object having left the surface and no longer being detected. For example, when a substantial change in resulting signals associated with an input object occurs. Additionally, one or more contact sensors could be utilized. In some cases it may desirable to initiate the transition T2 only when such a substantial change occurs for a period of time to avoid prematurely switching from the first sensing regime 502.

The transition T3 transitions from the detection regime 506 to the second regime 504. In accordance with the various embodiments described herein, the transition T3 may be initiated in response to a variety of criteria. In general, such criteria would be selected to be highly indicative of gloved finger or other similar input in the sensing region.

Specifically, the T3 transition would be implemented to initiate a switch to the second regime in response to an input gesture that meets a set of criteria. The set of criteria are selected to be indicative of a user attempting to utilize a gloved finger to input on the device. Thus, when detected, the processing system may reasonably switch to the second sensing regime to facilitate input with gloved fingers when such an input gesture is detected. As will be described in greater detail below, this set of criteria may include a measure of sensor value stability corresponding to the input gesture being beyond a sensor value stability threshold level. The criteria may further include a measure of vertical position corresponding to the input gesture being below a high threshold level and above a low threshold level. The criteria may further include a measure of lateral positional stability corresponding to the input gesture being beyond a lateral positional stability threshold level. Finally, criteria may further include a measure of size corresponding to the input gesture being beyond a size threshold level. Each of these criteria, used alone or in various combinations, are highly indicative of gloved finger being used for input, and thus may be used to initiate the transition T3.

It should be noted operating in the first sensing regime 502 (whether as default or otherwise) may inherently make it more difficult for the processing system to detect and/or recognize gloved fingers when the user attempts to use them in this regime. This inability to reliably detect gloved fingers while in the first sensing regime makes it problematic for a user to use such a gloved finger to initiate a switch to the second sensing regime. It is for this reason that the detection regime 506 is provided. Specifically, detection regime 506 provides the ability for the criteria of transition T3 to be reliably detected and interpreted.

The transition T4 transitions back from the second regime 504 to the detection regime 506. A variety of criteria can be used to initiate such a transition T4. In general, criteria would be selected that are indicative of an input object no longer hovering over the surface, or when a gloved object is no longer at the surface. For example, when a substantial change in resulting signals associated with a hovering or gloved input object occurs. In some cases it may desirable to initiate the transition T4 only when such a substantial change occurs for a period of time to avoid prematurely switching from the second sensing regime 504.

The transition T5 transitions from the second regime 504 to the first regime 502. A variety of criteria can be used to initiate such a transition T5. Similar to the transition T1, the transition T5 may be implemented to may be implemented to transition to the first regime 502 when contact on the sensing surface is detected. Such contact information may be derived from the sensor electrodes or may be derived from additional contact sensors. In such an embodiment it may be desirable to distinguish between conductive and non-conductive objects, such that the transition T5 occurs only in response to a conductive object touching the touch surface. As another example, the transition T5 may be implemented to transition when changes in resulting signals beyond a threshold level are detected.

Returning to FIG. 4, in some embodiments the input device comprises an input surface, a plurality of capacitive sensor electrodes arranged under the input surface, a display screen arranged under the input surface. In these embodiments the processing system would additionally be communicatively coupled to the plurality of capacitive sensor electrodes and the display screen. In cases where the capacitive input device overlaps the display screen the combined device may be referred to as a "touch screen". In such an embodiment the processing system 400 is additionally configured to operate the display screen to display images to a user.

In such "touch screen" devices the set of criteria can additionally comprise that the input is proximate a designated icon on the display. In such an embodiment the criteria may be met when user performs the input gesture to start or otherwise be proximate the designated icon. In some cases, this icon can also indicate other functions, such as a generalized "unlock" icon used to awaken or otherwise activate the device. Again, the criteria of proximity to such a designated icon may be combined with other criteria to cause the processing system 400 to switch to the second sensing regime. Detailed examples of multiple criteria being used will be described below.

In any of these embodiments it may be desirable to switch to the first sensing regime when certain conditions occur. For example, when an input is detected by the processing system 400 that is likely to have been generated by an ungloved finger. This can be determined by measuring signals for changes that are indicative of an ungloved finger being used. Or the device can be implemented to switch to the first sensing regime as a default when no input has been detected for a period of time.

As noted above, one criterion in the set of criteria may comprise a measure of sensor value stability corresponding to the input gesture being beyond a sensor value stability threshold level. In general, the measure of sensor value stability comprises a measure of the aggregate change in sensor values over some time period. For example, the measure of sensor value stability can be generated from amplitudes in the sensor values, and specifically a measure of how the amplitudes in sensor values change corresponding to a spatial area change over some time period. Thus, the measure of sensor value stability can be used to determine that a finger or other objects has stopped moving toward or away from the surface, and thus can be indicative of a gloved finger having contacted the surface. In general, if a user were merely to be merely "hovering" over the touch surface (perhaps because of indecisiveness) it will be difficult for the user to maintain a relatively constant distance from the surface, and thus the measure of sensor value stability will be relatively low. In contrast, if the user actually contacts the touch surface with a gloved finger and holds the gloved finger there, there is likely to be less change over time in the distance between the finger and the surface, resulting in a higher level of sensor value stability. Thus, a higher measure of sensor value stability is indicative of a gloved finger touching the touch surface.

Thus, by comparing a measure of sensor value stability to a stability threshold level it can be determined if an object is likely a gloved finger contacting the surface. As one example implementation, the measure of sensor value stability can be determined by summing the change in sensor values amplitudes over a time period. Thus, when an input gesture is such that the measure of sensor value stability is beyond a threshold level, the processing system 400 can respond to the input gesture by switching to the second sensing regime for gloved finger detection.

As noted above, another criterion in the set of criteria may comprise a measure of vertical position corresponding to the input gesture being below a high threshold level and above a low threshold level. A measure of the vertical position corresponding to the input gesture provides an indication of how close a conductive input object is to the touch surface. Thus, the "vertical" position direction in this discussion corresponds to the distance away from the touch surface in an orthogonal direction from the touch surface. In one embodiment, the measure of the vertical position is determined at least in part from measured sensor value amplitudes, such as by comparing sensor value amplitudes to appropriate threshold values. In general the threshold values are used to identify likely gloved fingers by determining that a conductive object is close enough to be sensed as a gloved finger, but not so close that it could instead be an ungloved finger directly touching the touch surface.

Specifically, to identify a potential gloved finger the measure of vertical position is compared to a "high threshold level" and a "low threshold level". In one embodiment where higher signal amplitude corresponds to a closer conductive object, the "high threshold level" is selected to be indicative of a conductive object being away from the surface at least a predetermined distance. Thus, when a measure of vertical position is below the high threshold level it is likely that the conductive object is at least some distance away from the touch surface (and thus not touching the touch surface directly), with that distance corresponding to the separation distance caused by a typical glove.

Likewise, the measure of vertical position is compared to a "low threshold level". In one embodiment, where again a higher signal amplitude corresponds to a closer conductive object, the "low threshold level" is selected to be indicative of a conductive object being within a predetermined distance of the surface. Thus, a measure of vertical position is above the low threshold level it is likely that the conductive object is not so far away as to be unable to be reliably detected, even in the second sensing regime with higher sensitivity. Stated another way, the low threshold level can be used to set how thick the glove can be and still allow a user to switch to the second sensing regime based at least in part on the signal amplitude.

Thus, by selecting the "high threshold level" and "low threshold level" appropriately, a measure of vertical position can be used to determine when conductive objects are within the range of a likely gloved finger, where the gloved finger is touching the touch surface, and can thus be used as criteria to determine when an input gesture is such that the input device should be switched to the second sensing regime.

As noted above, one criterion in the set of criteria may comprise a measure of lateral positional stability corresponding to the input gesture being beyond a lateral positional stability threshold level. In general, the measure of lateral position stability is a measure of movement of a conductive object across the touch surface. Thus, the measure of lateral position stability can be used to determine when an object has ceased moving across the touch surface. When the measure of lateral position stability is thus above a lateral position stability threshold, then the conductive object has ceased motion within a threshold, and such ceasing of motion can be indicative a gloved finger touching the touch surface and holding position. Thus, such criteria can be used to determine when an input gesture is such that the input device should be switched to the second sensing regime.

As noted above, one criterion in the set of criteria may comprise a measure of size corresponding to the input gesture being beyond a size threshold level. In general, using the size corresponding to an input gesture can be used to distinguish actual intended input gestures from inadvertent interactions. For example, it can be used to determine that detected input is from a finger, and not just an input caused by inadvertent contact with another body part (e.g., a palm or leg brushing against the touch surface).

The measure of the size corresponding to the input gesture can be determined in a variety of ways. For example, by determining the number of sensor values that are beyond a threshold value. In some cases, by determining the number of adjacent sensor values in a group that likely corresponds to an input object in the sensing region. In these cases, the number of sensor values that are beyond a threshold would correspond to number of "pixels" that capacitively detect an object. Thus, the greater the number of sensor values beyond a threshold, the larger the size of the input object and the more likely that the input object is the result of an inadvertent proximity rather than an intended input with a finger. Thus, the measure of size can be used as criteria to determine when an input gesture is such that the input device should be switched to the second sensing regime.

Another criterion in the set of criteria may comprise the input being proximate a designated location on the input device. For example, the input being proximate an icon at the designated location on the display in a touch screen implementation. The designated location can serve as the beginning location of the input gesture used to initiate switching to the second sensing regime. Alternatively, the designated location can serve as the end or other part of the input gesture.

In either case, the input device can be configured to analyze an input gesture when it occurs proximate the designated location to determine if the input gesture indicates a switch to the second sensing regime. Having such designated locations on the input device can allow a user to more reliably initiate the input device switching to the second sensing regime as needed.

In one particular embodiment, the designated location corresponds to the location of an unlock icon on the input device. In such an embodiment the same gesture used to unlock the device can be used to switch the device to the second sensing regime.

Figure 6:
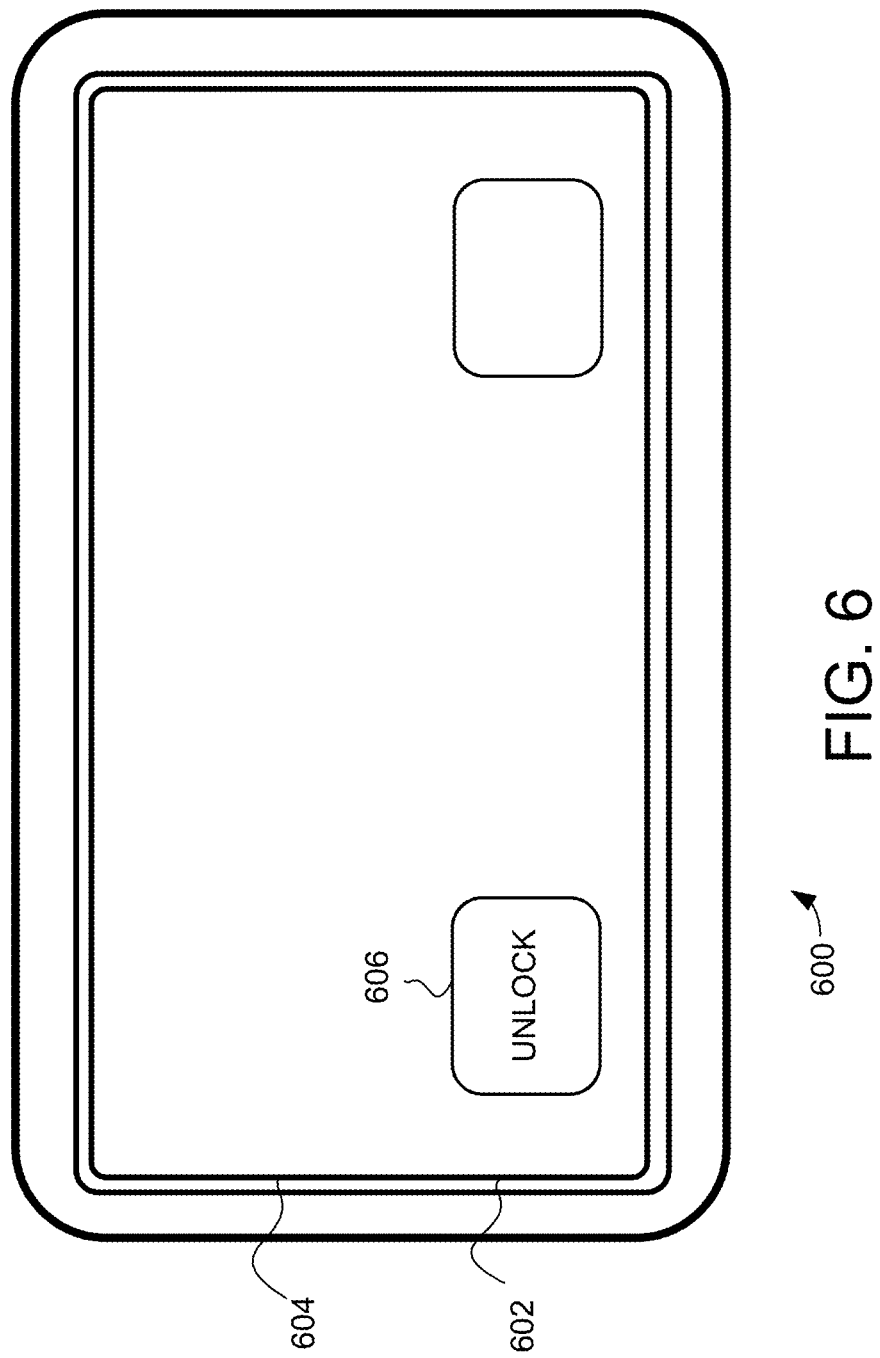
FIGS. 6-8 are schematic views of a device in accordance with an embodiment of the invention.
Figure 7:
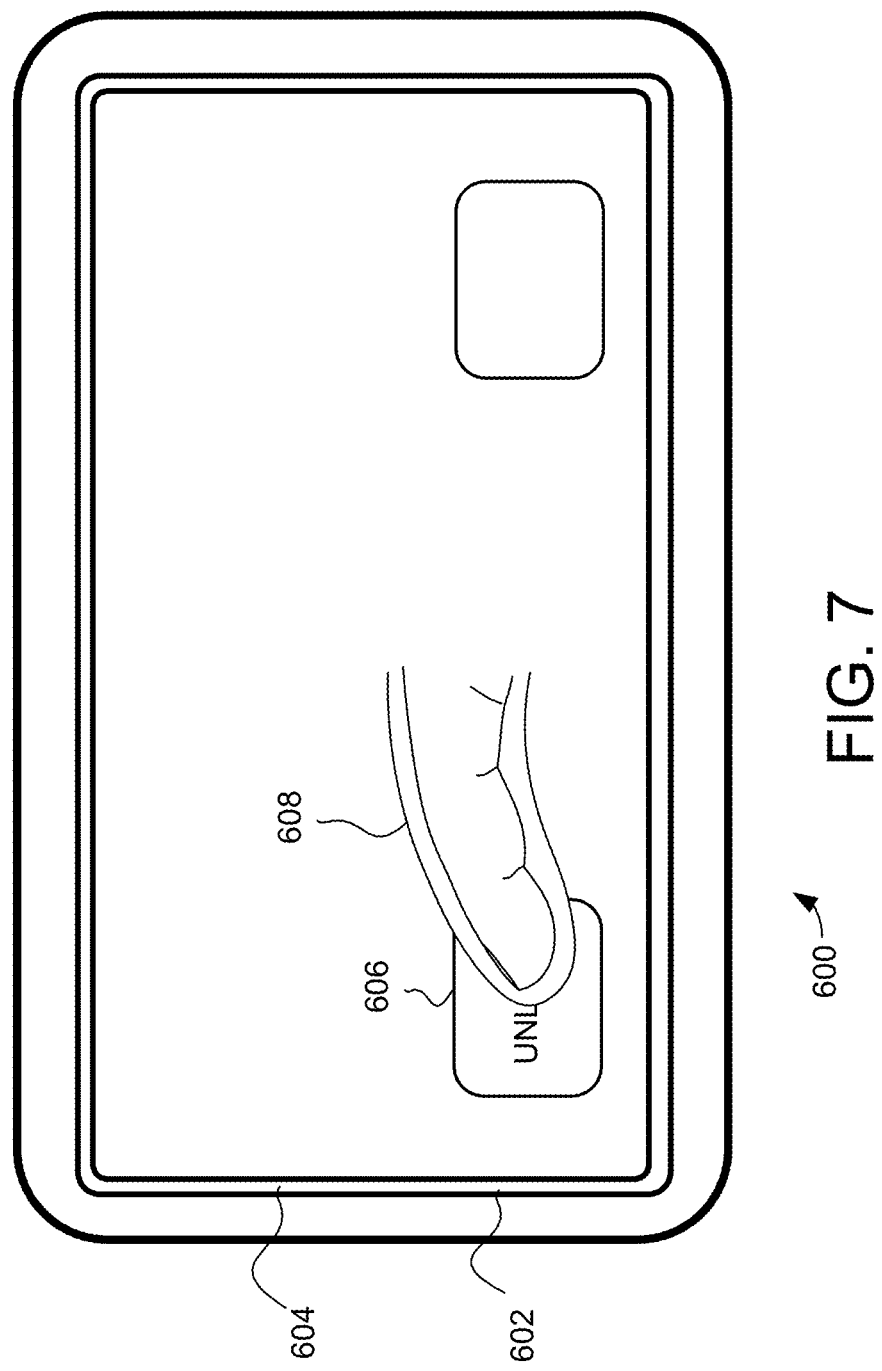
Figure 8:
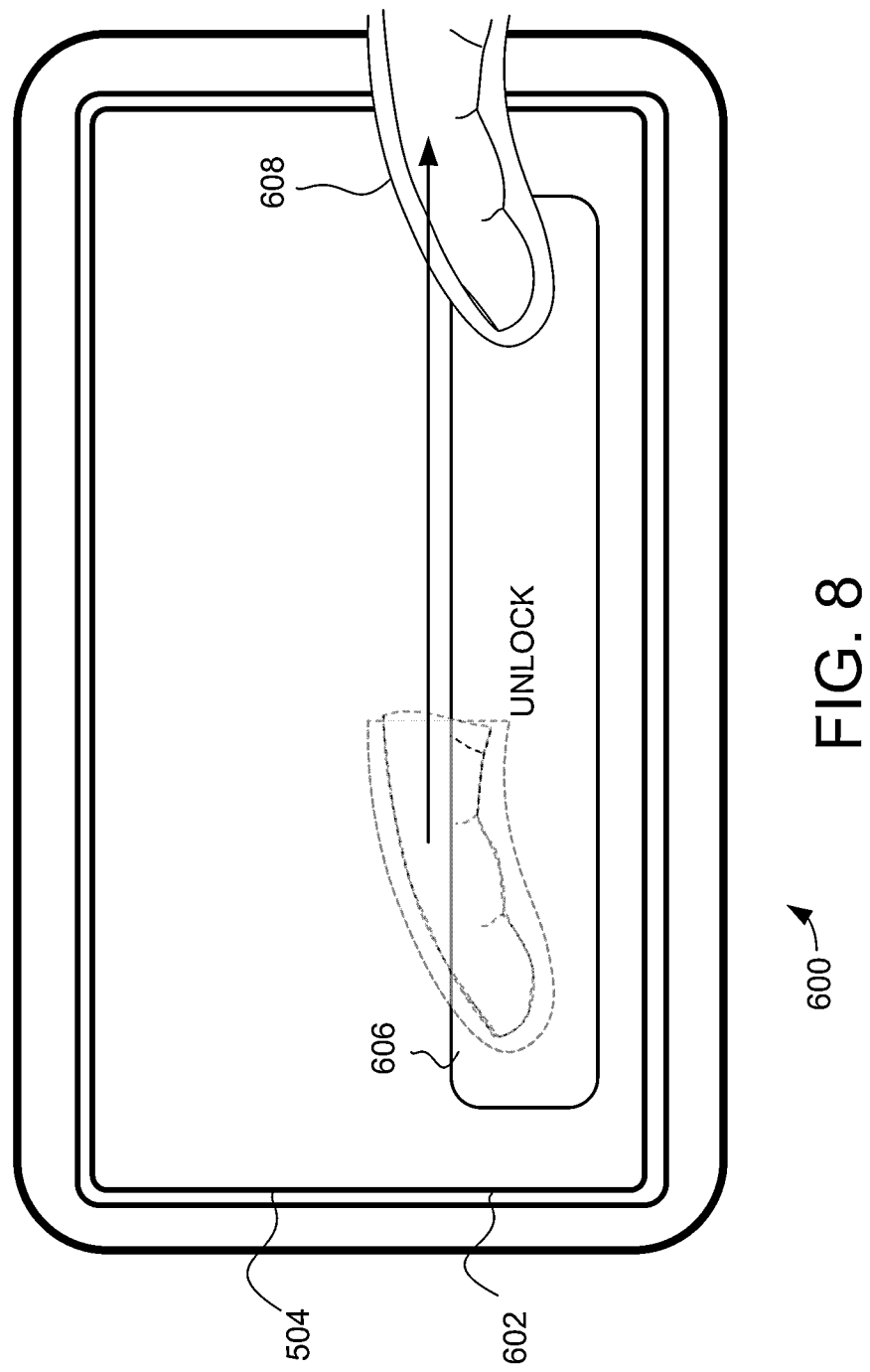

Turning now to FIGS. 6-8, an example of an electronic device 600 is illustrated. The electronic device 600 is exemplary of the many types of electronic devices in which an input device may be implemented. Accordingly, the device 600 includes a touch screen that comprises a touch surface 602 overlapping a display 602. Not shown in FIGS. 6-8 are the plurality of capacitive sensing electrodes and the processing system. The processing system is configured to operate the plurality of capacitive sensor electrodes to generate sensor values indicative of input objects in a sensing region. The processing system is further configured to selectively operate in a first sensing regime configured to determine positional information for ungloved fingers in the sensing region, and selectively operate in a second sensing regime configured to determine positional information for gloved fingers in the sensing region. The processing system is further configured to switch to operating in the second sensing regime responsive to detecting an input gesture that meets each of a set of criteria, where the set of criteria includes a measure of sensor value stability corresponding to the input gesture being beyond a sensor value stability threshold level. So implemented, the input device allows a user to easily switch between two different sensing regimes, and thus can facilitate the use of the device with both gloved and ungloved fingers providing input.

In the embodiment illustrated in FIGS. 6-8 an "unlock icon" 606 is used to indicate where a user starts a slide action to unlock the electronic device 600. In accordance with this example, that same unlock icon 606 is used a designated location for an input gesture used to initiate a switch to a second sensing regime.

Turning to FIG. 7, the electronic device 600 is illustrated with a gloved finger 608 proximate the unlock icon 606. In accordance with the embodiments of the invention, the processing system can determine if the input gesture meets the set of criteria that indicate a gloved finger input and thus can be used to initiate a switch to the second sensing regime.

As one example, when an input object is sensed proximate the unlock icon 606, the processing system evaluates the input to determine if a measure of sensor value stability corresponding to the gloved finger 608 is beyond a sensor value stability threshold level. The processing system may also determine if a measure of vertical position for the gloved finger 608 is below a high threshold level and above a low threshold level. The processing system may also determine if a measure of lateral positional stability for the gloved finger 608 is beyond a lateral positional stability threshold level. Finally, the processing system may determine if a measure of sensed size of the gloved finger 608 is beyond a size threshold level.

By determining each of these criteria, the processing system can reliably determine that a user is attempting to unlock the electronic device 600 with a gloved finger. As such, the processing system can initiate a switch to the second sensing regime, thus facilitating accurate position determination for the gloved finger 608. This will then allow a user to unlock the device with the gloved finger 608, for example, by sliding the gloved finger 608 across the sensing region as illustrated in FIG. 8.

In many cases it will be desirable for the input device to provide feedback to the user indicating that a switch in sensing regime has occurred. For example, the input device 600 can be configured to provide haptic feedback to a user when a switch of sensing regime has occurred. Other types of feedback that may be provided include visual and audible feedback. In any case providing such feedback allows a user to know how long a gloved finger such as gloved finger 608 should be held proximate to the unlock icon before the second sensing regime is initiated and the slide action will thus be reliably detected by the input device.

As noted above, in accordance with the various embodiments the processing systems and input devices are adapted to selectively operate in at least two different sensing regimes. Again, the first sensing regime is adapted to determine position information for objects at the surface of the input device such as ungloved fingers, while the second sensing regime is adapted to determine position information for objects that are away from the surface, such as gloved or hovering fingers. These sensing regimes can be implemented in a variety of ways. In general, the first sensing regime is configured to indicate positional information for input objects in the sensing region using relatively low sensitivity techniques configured to detect ungloved fingers, while the second sensing regime is configured to indicate positional information for input objects in the sensing region using relatively high sensitivity techniques configured to detect gloved fingers. For example, the input device can be adapted to filter signals received from the sensor electrode to improve the accuracy of the resulting position determination. In accordance with the embodiments described here, the input can be adapted to utilize different types or levels of filtering for the different sensing regimes. As a specific example, the processing system can be configured to filtering resulting signals at a first level of fidelity in the first sensing regime, and filter resulting signals at a second level of fidelity in the second sensing regime. In such embodiments it will generally be desirable for the first level of fidelity to be less than the first, such that the second sensing regime utilizes more aggressive filtering to remove noise and interference. This allows for improved accuracy of position determination in the first sensing regime, while the more aggressive filtering in the second sensing regime again facilities sensing gloved fingers or other such objects away from the surface.

As another example, the input device can be adapted to utilize different baseline procedures for the first and second sensing regimes. A typical capacitive sensor uses a baseline to measure signals associated with each electrode in the array of electrodes. To maintain accuracy, the sensor device periodically measures the signals associated with each electrode, and determines an appropriate offset for each electrode, with the offsets selected such that all of the electrodes measure from the same common baseline. These measurements preferably occur when no object is close enough to interfere with the calculation of the offsets. However, these measurements also preferably occur sufficiently often enough to keep the device properly calibrated.

In accordance with the embodiments described herein, the input device can use different baseline procedures for the first and second sensing regimes. For example, different baseline values can be determined and used for the different regimes. Likewise, different baseline values can be determined and used for absolute and transcapacitive sensing.

The input device can also utilize different techniques for determining positional information from measured sensor values in the different sensing regimes. For example, the input device can use curve fitting in the first sensing regime for determining object position for objects at the surface, and can use spatial correlation in the second sensing regime for determining object position for objects away from the surface.

In one particular embodiment the different sensing regimes can utilize different rates of absolute and transcapacitive sensing. Specifically, the input device can be implemented to operate in a first sensing regime that comprises a first duty cycle of absolute capacitive sensing and a first duty cycle of transcapacitive sensing, and to operate in a second sensing regime that comprises a second duty cycle of absolute capacitive sensing and a second duty cycle of transcapacitive sensing. In general, transcapacitive sensing provides the ability to reliably and accurately determine position information for multiple objects simultaneously in the sensing region, but it usually has a more limited sensing rang. In contrast, absolute capacitive sensing can provide a larger sensing range, but with more limited accuracy and ability to determine position of multiple objects simultaneously. Thus, by providing a first sensing regime with a smaller duty cycle of absolute capacitive sensing and a larger duty cycle of transcapacitive sensing, the processing system can facilitate accurate position determination for objects, including multiple objects that are at the surface, such as ungloved fingers touching the surface. Likewise, by providing a second sensing regime with a larger duty cycle of absolute capacitive sensing and a smaller duty cycle of transcapacitive sensing, the processing system 400 can facilitate position determination for objects that are away from a surface, such as gloved fingers. A detailed description of such an embodiment is described at U.S. patent application Ser. No. 13/536,755, now U.S. Pat. No. 9,024,643, entitled "Systems and Methods for Determining Types of User Input", filed on Jun. 28, 2012.

Thus, the various embodiments provide input devices configured to selectively operate in two different sensing regimes. The first sensing regime is configured to determine positional information for ungloved fingers in the sensing region. The second sensing regime is configured to determine positional information for gloved fingers in the sensing region. The input devices are further configured to switch to operating in the second sensing regime responsive to detecting an input gesture that meets each of a set of criteria, where the set of criteria includes a measure of sensor value stability corresponding to the input gesture being beyond a sensor value stability threshold level. So implemented, the input device allows a user to easily switch between two different sensing regimes, and thus can facilitate the use of the device with both gloved and ungloved fingers providing input.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for an input device comprising:
   a sensor module comprising sensor circuitry, the sensor module configured to:
   operate a plurality of capacitive sensor electrodes associated with a touch surface to generate sensor values indicative of input objects in a sensing region; and
   a determination module configured to:
   selectively operate in a first sensing regime that determines positional information for ungloved fingers in the sensing region;
   selectively operate in a second sensing regime that determines positional information for gloved fingers in the sensing region;
   obtain, at a start of a set time period, a first value of a summation of a plurality of sensor values from the plurality of capacitive sensor electrodes,
   wherein the plurality of sensor values is associated with an input gesture;
   obtain, at an end of the set time period, a second value of the summation of the plurality of sensor values from the plurality of capacitive sensor electrodes;
   measure a change in the summation by calculating a difference between the first value of the summation and the second value of the summation,
   wherein the change is inversely related to a sensor stability value;
   compare the sensor stability value to a sensor stability threshold;
   determine the input gesture is performed by a gloved finger touching the touch surface based on the sensor stability value exceeding the sensor stability threshold,
   wherein the sensor stability value results from the glove providing a stable separation distance between the touch surface and the gloved finger; and
   switch to operate in the second sensing regime in response to determining the input gesture is performed by the gloved finger.

2. The processing system of claim 1, wherein the determination module is further configured to:
   measure a vertical position corresponding to the input gesture; and
   compare the vertical position with a high threshold level and a low threshold level,
   wherein the high threshold level is indicative of the gloved finger being a first predetermined distance away from the touch surface,
   wherein the low threshold level is indicative of the gloved finger being a second predetermined distance away from the touch surface,
   wherein the second predetermined distance is greater than the first predetermined distance,
   wherein the low threshold level is selected based on glove thickness, and wherein determining the input gesture is performed by the gloved finger is further based on the vertical position exceeding the low threshold level but being less than the high threshold level.

3. The processing system of claim 2, wherein the vertical position is determined at least in part from a measure of sensor value amplitude.

4. The processing system of claim 1, wherein the determination module is further configured to:
measure an amount of movement across the touch surface,
wherein the amount of movement is inversely related to a lateral positional stability corresponding to the input gesture; and
compare the lateral position stability with a lateral positional stability threshold level,
wherein determining the input gesture is performed by the gloved finger is further based on the lateral position stability exceeding the lateral positional stability threshold level.

5. The processing system of claim 1, wherein the determination module is further configured to:
measure a size corresponding to the input gesture; and
compare the size with a size threshold level,
wherein determining the input gesture is performed by the gloved finger is further based on the size exceeding the size threshold level.

6. The processing system of claim 5, wherein the size corresponding to the input gesture is determined at least in part from a number of sensor values being beyond a threshold.

7. The processing system of claim 1, wherein the determination module is further configured to:
determine a proximity between the input gesture and a displayed unlock image on a display screen,
wherein the switch to operate in the second sensing regime is further in response to the proximity between the input gesture and the displayed unlock image.

8. The processing system of claim 1, wherein:
the determination module selectively operates in the first sensing by using a relatively low sensitivity technique to generate the sensor values; and
the determination module selectively operates in the second sensing regime by using a relatively high sensitivity technique to generate the sensor values.

9. The processing system of claim 1, wherein the determination module is further configured to:
switch from operating in the second sensing regime to the first sensing regime in response to a measure of sensor value amplitude corresponding to the input gesture being above a high threshold level for a determined time period.

10. The processing system of claim 1, wherein the determination module is further configured to:
provide an indication to a user of switching to operating in the second sensing regime, and wherein the indication comprises at least one selected from a group consisting of a haptic feedback, an audible feedback, and a visual feedback.

11. An input device comprising:
a plurality of capacitive sensor electrodes associated with a touch surface; and
a processing system coupled to the plurality of capacitive sensor electrodes, the processing system configured to:
operate the plurality of capacitive sensor electrodes to generate sensor values indicative of input objects in a sensing region;
selectively operate in a first sensing regime that determines positional information for ungloved fingers in the sensing region;
selectively operate in a second sensing regime that determines positional information for gloved fingers in the sensing region;
obtain, at a start of a set time period, a first value of a summation of a plurality of sensor values from the plurality of capacitive sensor electrodes,
wherein the plurality of sensor values is associated with an input gesture;
obtain, at an end of the set time period, a second value of the summation of the plurality of sensor values from the plurality of capacitive sensor electrodes; and
measure a change in the summation by calculating a difference between the first value of the summation and the second value of the summation,
wherein the change is inversely related to a sensor stability value;
compare the sensor stability value to a sensor stability threshold; and
determine the input gesture is performed by a gloved finger touching the touch surface based on the sensor stability value exceeding the sensor stability threshold,
wherein the sensor stability value results from the glove providing a stable separation distance between the touch surface and the gloved finger; and
switch to operate in the second sensing regime in response to determining the input gesture is performed by the gloved finger.

12. The input device of claim 11, wherein the processing system is further configured to:
measure a vertical position corresponding to the input gesture;
compare the vertical position with a high threshold level and a low threshold level,
wherein the high threshold level is indicative of the gloved finger being a first predetermined distance away from the touch surface,
wherein the low threshold level is indicative of the gloved finger being a second predetermined distance away from the touch surface,
wherein the second predetermined distance is greater than the first predetermined distance,
wherein the low threshold level is selected based on glove thickness, and
wherein determining the input gesture is performed by the gloved finger is further based on the vertical position exceeding the low threshold level but being less than the high threshold level.

13. The input device of claim 11, wherein the processing system is further configured to:
measure an amount of movement across the touch surface,
wherein the amount of movement is inversely related to a lateral positional stability corresponding to the input gesture;
compare the lateral position stability with a lateral positional stability threshold level;
measure a size corresponding to the input gesture; and
compare the size with a size threshold level,
wherein determining the input gesture is performed by the gloved finger is further based on the lateral position stability exceeding the lateral positional stability threshold level and the size exceeding the size threshold level.

14. The input device of claim 11, wherein the set of criteria further includes processing system is further configured to:
determine a proximity between the input gesture and a displayed unlock image on a display screen,
wherein the switch to operate in the second sensing regime is further in response to the proximity between the input gesture and the displayed unlock image.

15. The input device of claim 11, wherein the processing system is further configured to:
switch from operating in the second sensing regime to the first sensing regime in response to a measure of sensor value amplitude corresponding to the input gesture being above a high threshold level for a determined time period.

16. The input device of claim 11, wherein the processing system is further configured to:
provide an indication to a user of switching to operating in the second sensing regime, and wherein the indication comprises at least one selected from a group consisting of a haptic feedback, an audible feedback, and a visual feedback.

17. An input device comprising:
an input surface;
a plurality of capacitive sensor electrodes arranged under the input surface;
a display screen arranged under the input surface; and
a processing system coupled to the plurality of capacitive sensor electrodes and the display screen, the processing system configured to:
operate the display screen to display images to a user;
operate the plurality of capacitive sensor electrodes to generate sensor values indicative of capacitively detected input objects in a sensing region proximate the input surface;
selectively operate in a first sensing regime and a second sensing regime,
wherein while operating in the first sensing regime the processing system indicates positional information for input objects in the sensing region using a relatively low sensitivity technique to detect ungloved fingers, and
wherein while operating in the second sensing regime the processing system indicates positional information for input objects in the sensing region using a relatively high sensitivity technique to detect gloved fingers;
determine a proximity between the input gesture and a displayed unlock icon image on the display screen;
measure a vertical position corresponding to the input gesture;
compare the vertical position with a high threshold level and a low threshold level,
measure an amount of movement across the input surface,
wherein the amount of movement is inversely related to a lateral positional stability corresponding to the input gesture;
compare the lateral position stability with a lateral positional stability threshold level;
measure a size corresponding to the input gesture;
compare the size with a size threshold level;
obtain, at a start of a set time period, a first value of a summation of a plurality of sensor values from the plurality of capacitive sensor electrodes,
wherein the plurality of sensor values is associated with the input gesture;
obtain, at an end of the set time period, a second value of the summation of the plurality of sensor values from the plurality of capacitive sensor electrodes; and
measuring measure a change in the summation by calculating a difference between the first value of the summation and the second value of the summation
wherein the change is inversely related to a sensor stability value;
compare the sensor stability value with a sensor stability threshold;
determine the input gesture is performed by a gloved finger touching the input surface based on:
the sensor stability value exceeding the sensor stability threshold;
the vertical position being below a high threshold level and above a low threshold level; and
the size being beyond the size threshold level,
wherein the sensor stability value results from the glove providing a stable separation distance between the input surface and the gloved finger,
wherein the high threshold level is indicative of the gloved finger being a first predetermined distance away from the input surface,
wherein the low threshold level is indicative of the gloved finger being a second predetermined distance away from the input surface,
wherein the second predetermined distance is greater than the first predetermined distance,
wherein the low threshold level is selected based on glove thickness; and
switch to operate in the second sensing regime in response to determining the input gesture is performed by the gloved finger and the input gesture being proximate to the displayed unlock icon image.

18. A method for determining input for a capacitive input device comprising:
operating a plurality of capacitive sensor electrodes to generate sensor values indicative of input objects in a sensing region associated with a touch surface;
determining positional information for ungloved fingers in the sensing region in a first sensing regime;
obtaining, at a start of a set time period, a first value of a summation of a plurality of sensor values from the plurality of capacitive sensor electrodes;
obtaining, at an end of the set time period, a second value of the summation of the plurality of sensor values from the plurality of capacitive sensor electrodes;
measuring a change in the summation by calculating a difference between the first value of the summation and the second value of the summation,
wherein the change is inversely related to a sensor stability value;
comparing the sensor stability value with a sensor stability threshold;
determining the input gesture is performed by a gloved finger touching the touch surface based on the sensor stability value exceeding the sensor stability threshold,
wherein the sensor stability value results from the glove providing a stable separation distance between the touch surface and the gloved finger; and switching to operate in the second sensing regime in response to determining the input gesture is performed by the gloved finger, wherein the second sensing regime determines positional information for gloved fingers in the sensing region.

19. The method of claim 18, further comprising:

measuring a vertical position corresponding to the input gesture;

comparing the vertical position with a high threshold level and a low threshold level, wherein the high threshold level is indicative of the gloved finger being a first predetermined distance away from the touch surface, wherein the low threshold level is indicative of the gloved finger being a second predetermined distance away from the touch surface, wherein the second predetermined distance is greater than the first predetermined distance, wherein the low threshold level is selected based on glove thickness, and wherein determining the input gesture is performed by the gloved finger is further based on the vertical position exceeding the low threshold value but being less than the high threshold level.

20. The method of claim 18, further comprising:

measuring an amount of movement across the touch surface, wherein the amount of movement is inversely related to a lateral positional stability corresponding to the input gesture;

comparing the lateral position stability with a lateral positional stability threshold level;

measuring a size corresponding to the input gesture; and comparing the size with a size threshold level, wherein determining the input gesture is performed by the gloved finger is further based on the lateral position stability exceeding the lateral positional stability threshold level and the size exceeding the size threshold level.

21. The method of claim 18, further comprising:

switching from operating in the second sensing regime to the first sensing regime in response to a measure of sensor value amplitude corresponding to the input gesture being above a high threshold level for a determined time period.

\* \* \* \* \*

UNITED STATES PATENT AND TRADEMARK OFFICE
CERTIFICATE OF CORRECTION

PATENT NO. : 9,678,605 B2  
APPLICATION NO. : 13/536776  
DATED : June 13, 2017  
INVENTOR(S) : Joel Jordan et al.

It is certified that error appears in the above-identified patent and that said Letters Patent is hereby corrected as shown below:

In the Claims

Claim 17, Column 24, Line 10, the word "measuring" at the beginning of the line should be removed.

Claim 17, Column 24, Line 12, a --,-- should be inserted after the word summation at the end of the line.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*